United States Patent
Murakami et al.

(10) Patent No.: US 7,177,300 B2
(45) Date of Patent: Feb. 13, 2007

(54) PACKET COMMUNICATION METHOD AND PROPOSAL NODE

(75) Inventors: Homare Murakami, Tokyo (JP); Gang Wu, Tokyo (JP); Masugi Inoue, Tokyo (JP)

(73) Assignee: Communications Research Laboratory, Independent Administrative Institution, Tokyo (JP)

( * ) Notice: Subject to any disclaimer, the term of this patent is extended or adjusted under 35 U.S.C. 154(b) by 1020 days.

(21) Appl. No.: 10/153,799

(22) Filed: May 24, 2002

(65) Prior Publication Data

US 2003/0095537 A1 May 22, 2003

(30) Foreign Application Priority Data

Nov. 21, 2001 (JP) ............................. 2001-356498

(51) Int. Cl.
H04L 12/26 (2006.01)
H04J 1/16 (2006.01)
G08C 15/00 (2006.01)
G06F 11/00 (2006.01)

(52) U.S. Cl. .................. 370/349; 370/235; 370/338
(58) Field of Classification Search ........ 370/216–254, 370/338–352, 394–401; 709/227–234; 714/748–749
See application file for complete search history.

(56) References Cited

U.S. PATENT DOCUMENTS

| 5,963,551 A | * | 10/1999 | Minko | 370/356 |
|---|---|---|---|---|
| 6,208,620 B1 | * | 3/2001 | Sen et al. | 370/231 |
| 6,208,653 B1 | * | 3/2001 | Ogawa et al. | 370/395.52 |
| 6,611,495 B1 | * | 8/2003 | Meyer et al. | 370/230.1 |
| 6,687,227 B1 | * | 2/2004 | Li et al. | 370/231 |
| 6,687,846 B1 | * | 2/2004 | Adrangi et al. | 714/4 |
| 6,757,248 B1 | * | 6/2004 | Li et al. | 370/235 |
| 6,772,334 B1 | * | 8/2004 | Glawitsch | 713/153 |
| 6,934,257 B2 | * | 8/2005 | Liu et al. | 370/236 |
| 2003/0022628 A1 | * | 1/2003 | Mamiya et al. | 455/67.1 |
| 2003/0055980 A1 | * | 3/2003 | Liu et al. | 709/227 |
| 2003/0063564 A1 | * | 4/2003 | Ha et al. | 370/230 |
| 2006/0002301 A1 | * | 1/2006 | Liu et al. | 370/236 |

FOREIGN PATENT DOCUMENTS

| JP | 07-312610 | 11/1995 |
|---|---|---|
| JP | 2000-134279 | 5/2000 |
| JP | 2000-253447 | 9/2000 |
| WO | WO-00/01118 | 1/2000 |

* cited by examiner

*Primary Examiner*—Man U. Phan
(74) *Attorney, Agent, or Firm*—Birch, Stewart, Kolasch & Birch, LLP

(57) ABSTRACT

Upon recovery of communication, this recovery is detected by communication recover detector and then optimal times duplicated pseudo acknowledgements calculated by arithmetic unit are transmitted from ACK transmitter. During normal state, advertisement is made in small value of advertised receive window size and immediately after recovery state, advertisement is made in expanded window size.

15 Claims, 4 Drawing Sheets

PACKET COMMUNICATION METHOD AND PROPOSAL NODE

BACKGROUND OF THE INVENTION

1. Technical Field

The present invention relates to method of packet communication in radio communication using TCP protocol and particularly to such method allowing normal communication to be rapidly recovered after communication interruption has occurred.

2. Related Art

Recent popularization of cellular phone and internet is hastening development of high speed radio communication technique. The inventors also have already developed high speed radio access systems serving as local and nonlocal area systems and achieved transmission rate of 156 Mbps.

However, radio communication may sometimes suffer from decrease of transmission rate due to interruption of communication. Particularly in system adopting millimeter wave band which attract attention of those skilled in the art as frequency resource in future, such wave band is readily affected by shadowing even by human body or the like. Accordingly, it is important not only to prevent communication interruption from occurring due to such shadowing but also to minimize affection of such shadowing.

TCP adopted also by internet provides perfect error control as well as flow control so that retransmission may be started upon recovery of communication interruption.

Retransmission by TCP has conventionally assumed that packet loss occurs due to congestion and often taken much time for retransmission against a plurality of continuous packet losses which are prone to occur due to wireless communication interruption. Consequently, TCP communication has often been disabled for a period longer than the period of communication interruption in wireless link layer.

To overcome this problem, several studies on radio environment accommodating TCP have been reported. For example, according to snoop protocol described in H. Balakrishnan, S. Seehan and R. H. Katz, "Improving Reliable-Transport and Handoff Performance in Cellular Wireless Networks", ACM Wireless Networks 1(4), December, 1995, base transceiver station is provided with agent adapted to monitor respective connections and in response to request for retransmission from radio terminals to absorb and respond by proxy so as to prevent transmission rate from being decreased due to retransmission.

However, such method of prior art has not been effective to control the errors continuously occurring for a period longer than a certain period due to communication interruption. In addition, the arrangement in which the base transceiver station is provided with the agent or both server and clients are modified is too complex to arrange and increases cost.

None of the conventional techniques offers effective method to solve these problems still remaining as barriers against the above described high speed radio communication techniques.

In view of the problems left behind by the prior art as have been described above, the present invention aims to provide a method of packet communication and a proposal node allowing retransmission to be rapidly started upon recovery of communication so as to compensate continuous packet losses due to communication interruption substantially without modification of the existing system and thereby contributing to simplification of arrangement and reduction of cost.

SUMMARY OF THE INVENTION

Method of packet communication according to the present invention is used in a network at least partially including radio communication area. After packet loss occurred due to interruption of wireless link between proposal node and general node, TCP layer of proposal node transmits a plurality of pseudo duplicated acknowledgements to general node upon recovery of communication. In this case, the buffer of TCP layer stores acknowledgements last transmitted from respective connections in order to transmit them as pseudo duplicated acknowledges.

In addition to duplicated acknowledgements, proposal node expands advertised receive window (awnd) size and notice it to general node. Upon reception of duplicated acknowledgements a plurality of times, general node transmits new packets corresponding to window expansion on proposal node.

An alternative arrangement is possible wherein advertised receive window side sets to small value (describes as awnd') during normal communication state and expands to large value (describes as awnd) corresponding to actual receiving buffer size upon recovery state.

D times pseudo duplicated acknowledgements are transmitted can be obtained by the following equation:

$$D = ceil(awnd/MSS)$$

where awnd represents advertised receive window size of proposal node after expanded on recovery state and MSS represents the maximum segment size.

While transmission of new packets is promoted by increasing the number of duplicated acknowledgements, the number of duplicated acknowledgements exceeding a predetermined value will be meaningless. The value obtained from above equation is the optimal value to promote rapid and reliable data retransmission.

The method of packet communication may also be arranged so that, for advertisement in minimized window size during normal state, proposal node calculates awnd' satisfying both of following inequality and equation:

$$2 > awnd/MSS + (6 - n(n+1)/2)$$

and $$n = (awnd - awnd')/MSS > awnd$$

where awnd represents advertised receive window size of proposal node on recovery state, awnd' represents the same on normal state and MSS represents the maximum segment size.

The present invention also provides proposal node adapted to make radio communication using TCP, comprising: means to monitor received signal power, to detect that the received signal level has been attenuated and exceeded a predetermined threshold level and thereby to decide to enter the recovery state; means to transmit pseudo duplicated acknowledgements; and means for adjusting the advertised receive window size of proposal node to transmit advertisement to general node.

The proposal node may be also arranged so that proposal node sets advertised receive window size to small value during normal state and expands advertised receive window size to actual receiving buffer size using size adjusting means after transmission of acknowledgements by pseudo duplicated signal transmitter means and transmits the advertised receive window size expanded in this manner to general node.

An arrangement is also possible such that proposal node transmits D times pseudo duplicated acknowledgements, D being calculated by $$D = ceil(awnd/MSS)$$

where awnd represents advertised receive window size of proposal node after expanded on recovery state and MSS represents the maximum segment size.

According to one preferred embodiment of the invention, for advertisement in small window size (awnd') during normal state, proposal node calculates awnd's satisfying both of following inequality and equation:

$$2 > awnd/MSS + (6 - n(n+1)/2)$$

and $$n = (awnd - awnd')/MSS$$

where awnd represents advertised receive window size of proposal node after expanded on recovery state, awnd' represents small value of advertised receive window size on normal state and MSS represents the maximum segment size.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
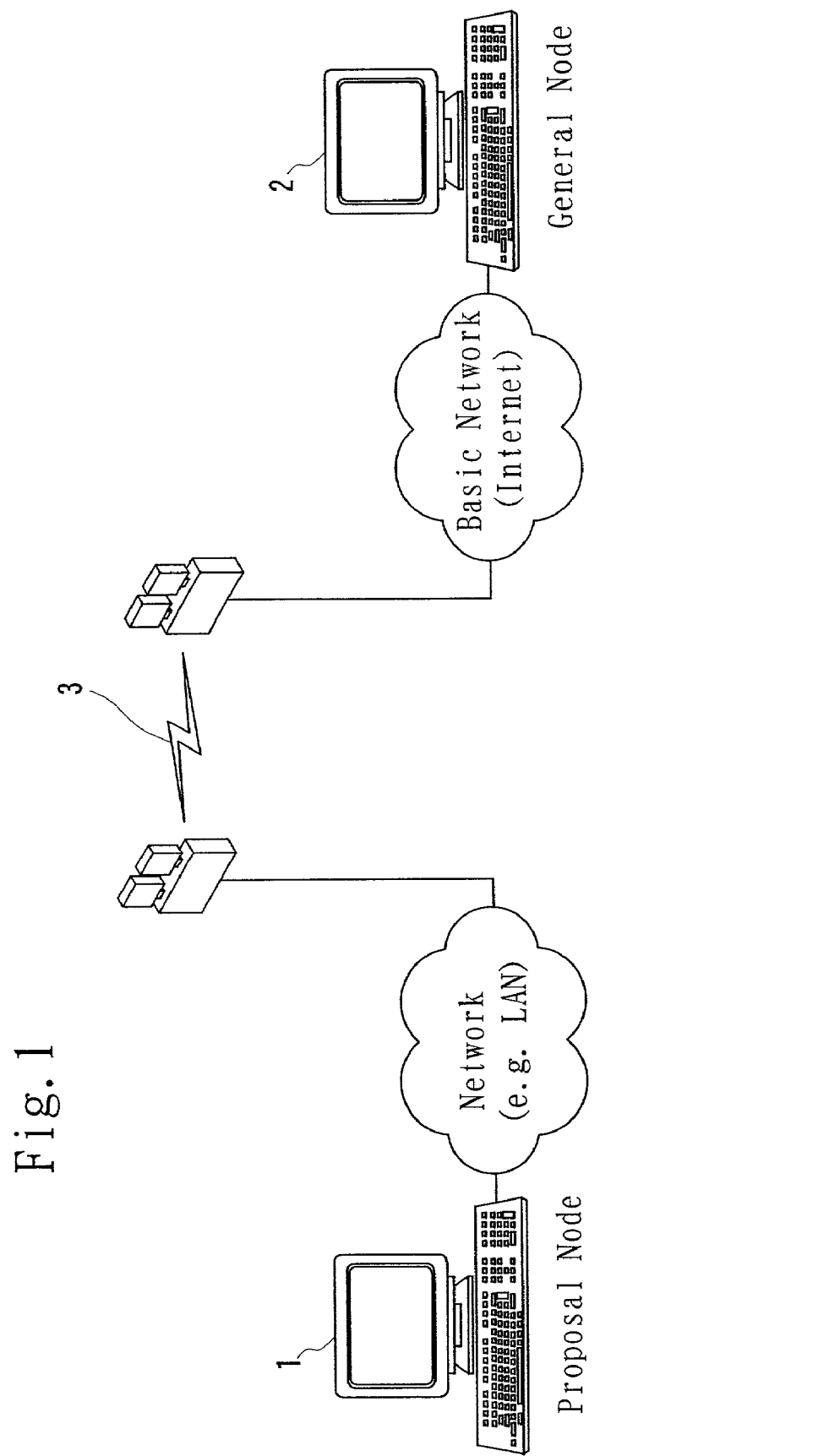
FIG. 1 is a schematic diagram illustrating network environment including of radio communication area in an embodiment of the present invention.

Radio communication channel has its condition varying at every moment and sometimes subjected to temporary interruption (referred to hereafter as communication interruption). Affection of such temporary communication interruption upon communication performance has become serious as transmission rate rises. Particularly when TCP is adopted as transport layer protocol, performance is remarkably deteriorated due to communication interruption. The present invention aims to provide a packet communication method allowing communication performance to be rapidly recovered after such communication interruption has occurred.

Communication interruption is caused by various factors such as handover and shadowing. Particularly system using high frequency such as wireless LAN at 5 GHz, and Fixed Wireless Access (FWA) at 22/26/38 GHz or 60 GHz has usually adopted for spot service, there is a demand for supporting mobile communication using a plurality of cells such as existing cellular phones. To realize this, the handover techniques will be necessary. In this case, however, any systematic disposition of cells in conventional manner will be difficult and handover may cause instantaneous communication interruption.

Shadowing, on the other hand, is a problem primarily due to rectilinear wave propagation characteristics of high frequency band. This is remarkable particularly over millimeter wave band and experiment conducted in office environment indicates that average duration of interruption is 0.3 seconds and average interruption occurrence interval is approximately 10 minutes.

Radio communication thus encounters problem of interruption occurring in physical layer and it has been found that such interruption seriously affects upper TCP layer. TCP is transport protocol which is most often adopted in the Internet and characterized by slow start/congestion control and retransmission control for compensation of packet loss due to buffer overflow occurring in rooter during congestion.

TCP designed on the basis of a cable network substantially free from transmission error detects and determines packet loss as the occurrence of congestion and thereupon reduces packet transmission rate in order to avoid congestion.

However, if TCP is adopted for network susceptible to the occurrence of random packet loss due to radio transmission error, congestion preventing algorithm would unacceptably reduce throughput. This is the conventional problem encountered by TCP in radio communication.

When burst packet error has occurred by communication interruption, transmitter cannot send new packet because buffer of transmitter's TCP are completely fulfilled and cannot accept any packets waiting for acknowledgements. This problem can not be solved by conventional measure of retransmission, such as fast recovery (referred to hereinafter simply as FRC) and selective acknowledgement (referred to hereinafter simply as SACK).

These functions are triggered by acknowledgement packet (referred to hereinafter simply as ACK) from receiving side and such ACK is not available during communication interruption. Absence of ACK causes two problems. TCP cannot retransmit the lost packets and cannot transmit new data packets.

Transmitter side's TCP and receiver side's TCP cooperate together to realize data transfer of high reliability and therefore, if connection is interrupted for a given period by the occurrence of burst error, TCP connection should inconveniently be forced to fulfill the buffer and just to wait timeout.

Though several attempts to rebuild TCP protocol to be aware of wireless condition have been made, it is not practical to force all servers on internet to modify TCP in this manner.

The present invention aiming to solve these problems will be more fully understood from following description given hereunder with respect to network environment illustrated by FIG. 1 in which radio area is used as so-called first hop/last hop and communications between general nodes are achieved via ip-based wired network (e.g., internet).

Assumed that proposal node (1) is receiving data upon occurrence of communication interruption is occurred on the links between proposal node (1) and general node (2), it is desirable that proposal node (1) can restart receiving packets as soon as communication has been recovered. However, in environment illustrated by FIG. 1, it is impossible for general node (2) to know the occurrence of communication interruption in radio area (3) and therefore proposal node (1) can not send retransmission data at once.

As an effective countermeasure to this problem, the invention adopts a procedure to proposal node (1) such that, upon recovery of communication, its lower layer may send the corresponding signal to its TCP layer. In order to recover desired transmission rate as rapidly as possible after communication has been recovered, it is essential for TCP layer to be informed the timing of communication interruption.

Proposal node determines whether lower layer properly receives downlink signal or not and thereby detects occurrence of communication interruption. More specifically, attenation of received signal power lower than a predetermined threshold level for a given period makes proposal node's lower layer to detect occurrence of communication interruption. On the other hand, it determines that communication has been recovered when received signal power has exceeded this threshold level.

For example, proposal node is incorporated with suitable means such as a device driver or a middle ware for interlayer communication (between lower layer and TCP layer).

However, communication recovery information obtained in this manner is not useful so far as this information stays on hand of proposal node (1). Because it is necessary for proposal node (1) to transmit this information to a corresponding node's TCP, proposal node (1) is incorporated with mechanism of transmitting pseudo duplicated acknowledgements (referred to hereinafter simply as pseudo ACKs) at the end of communication interruption.

In order that general node (2) used in this embodiment can retransmit lost packets, it is important that general node (2) receives three or more duplicated ACKs and enters in fast retransmit (referred to hereinafter simply as FRT) state. If such requirements are met, retransmission can be started as soon as communication is recovered.

In view of this, the present invention aims to provide an arrangement improved so that TCP layer on proposal node (1) can transmit pseudo ACKs and respective connections can retain the last received ACK used as original data for pseudo ACKs to be transmitted.

Such improvement effectively solves the above described problem that general node (2) cannot retransmit lost packet quickly at the end of communication interruption.

It is also essential that SACK retransmission function can work effectively. In order that proposal node (1) can transmit the information of discontinuously received packet to general node (2) using SACK block, new data packet must be received to make the SACK block at proposal node (1).

However, conventional TCP inevitably fills up TCP buffer of general node (2) when connection interruption has occurred and consequently transmission of new data packet in order to receive SACK block is impossible.

In view of this problem, the present invention aims to provide arrangement improved so that proposal node (1) advertises smaller size of advertised receive window (referred to hereinafter simply as awnd) than actual buffer size upon normal state, and advertises actual buffer size as awnd only upon recovery state.

According to TCP, whether transmission is possible or not is determined on the basis of two windows having different sizes. One of them is congestion window (referred to hereinafter simply as cwnd). Cwnd reflects actual situation of transmitter itself in such a manner that cwnd is expanded in response to receiving ACK normally, and reduced in response to occurrence of retransmission.

The other of these two windows is said awnd normally serving to indicate any available buffer amount on receiver side and thereby to prevent transmitter from making excessive data transmission.

According to transmitter's TCP, transmission control is carried out under relatively strict condition, in other words, with smaller one of these two window sizes. Specifically, transmitter may decide maximum amount of transmission in a round trip time equal to smaller on of cwnd and awnd.

To minimize modification of existing network, the present invention solves the problems encountered by conventional arrangement by setting awnd size which can be controllable by proposal node to appropriately small size. In the following description, awnd represents conventional advertised receive window size based on actual buffer size and awnd' represents size set to appropriately reduced size according to the invention.

Figure 2:
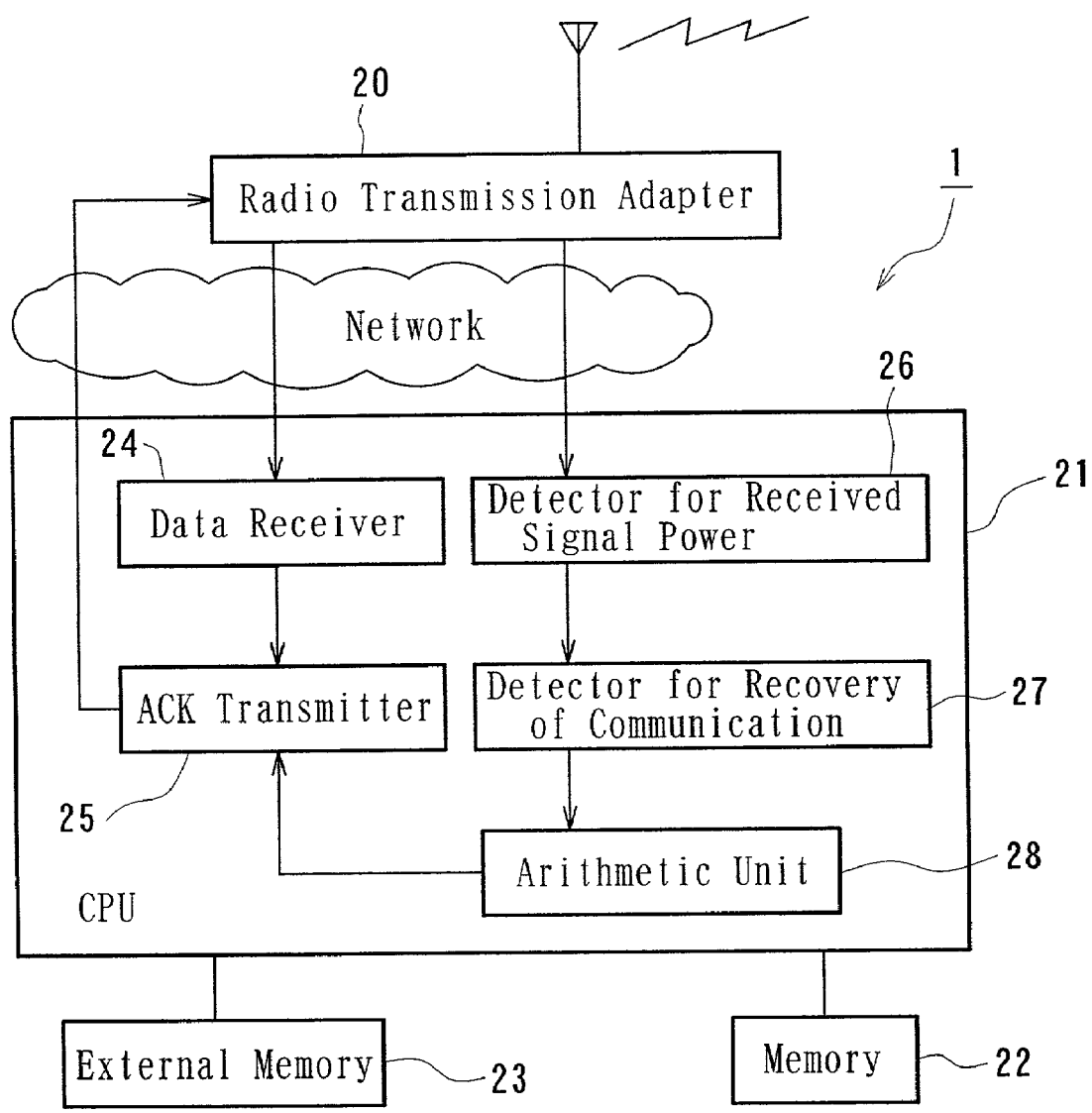
FIG. 2 is a block diagram illustrating proposal node according to the present invention.

FIG. 2 is a block diagram illustrating proposal node arranged to realize three features as have been described above. Proposal node (1) comprises radio communication adapter (20) having antenna/transmitting and receiving function for radio communication, CPU (21), memory (22) and external memory (23), wherein various functions are realized by CPU (21). Proposal node (1) according to the invention can be implemented also by programming it in personal computer or the like commonly used.

CPU (21) includes data receiver (24) to process data received from radio communication adapter (20) and ACK transmitter (25) adapted to transmit ACKs in response to receiving data packet correctly and also pseudo ACKs on recovery state. During normal state, data received by data receiver (24) are processed by application layer (e.g., ftp or telnet) and stored/displayed by external memory (23) and display unit (not shown).

Proposal node (1) according to the invention further includes received signal power detector (26) to detect signal power being received. Communication recovery detector (27) operates in association or integrally with data receiver (24) to detect the change of received signal power exceeded a predetermined threshold level (i.e., the end of communication interruption) and allows data communication to be recovered. In this way, the invention intends to achieve rapid recovery of communication.

In arithmetic unit (28), the number of said pseudo ACK transmissions as well as appropriate awnd/awnd' values are calculated and these numbers of pseudo ACKs are transmitted from ACK transmitter (25). Details of processing in arithmetic unit (28) will be described later.

It should be understood that a series of processing as have been described above are essential for the present invention but not restrict addition of any other functions. While data receiver (24) and received signal power detector (26) are separately illustrated on account of different functions of them, it is also possible to implement these receiver and detector by one and same circuit/program.

Figure 3:
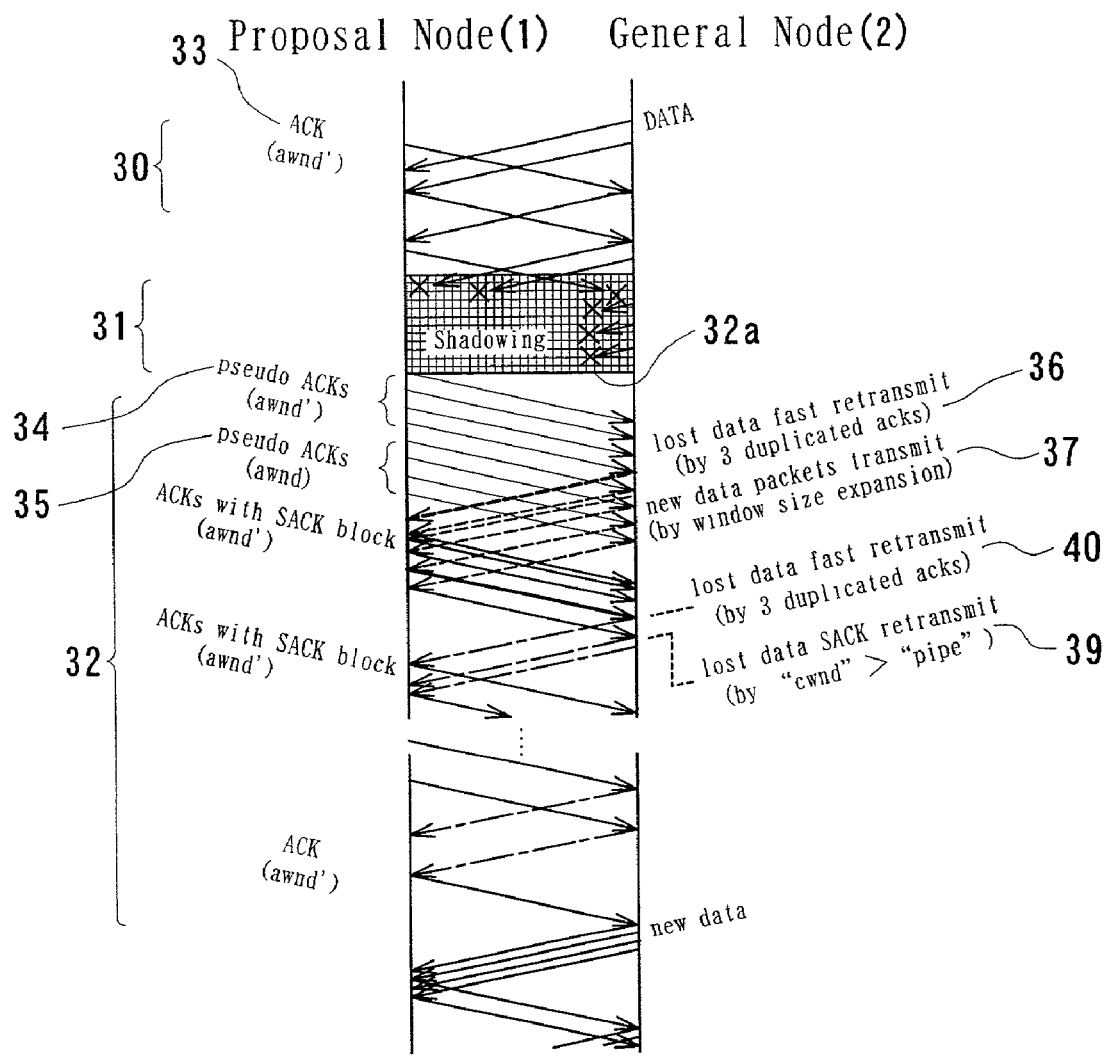
FIG. 3 is a diagram illustrating a flow of packet in the present invention.

Data communication method as has been described above is made between proposal node (1) and general node (2) in a manner as illustrated by FIG. 3.

In FIG. 3, reference numeral (30) designates normal communication state, reference numeral (31) designates communication interruption state and reference numeral (32) designates communication recovery state. In normal communication state (30), ACK (33) advertises awnd'. Upon recovery of radio condition (32a) after communication interruption state (31) in which neither transmission nor receiving of data can be made, communication recovery detector (27) detects this and transmits pseudo ACKs (34) (35). The necessary number of pseudo ACKs (35) is determined by arithmetic unit (28) and four pseudo ACKs (34) are transmitted in the illustrated case.

The former ACKs (34) are advertised in awnd' and the latter ACKs (35) are advertised in awnd corresponding to the actual receive buffer size of proposal node (1).

With such arrangement, the former pseudo ACKs (34) establish FRT state and cause a retransmission of first lost packet (36). Upon reception of duplicated pseudo ACKs, eight ACKs in this figure, general node has its cwnd sufficiently expanded to transmit new packet by FRC state of TCP. However, the maximum amount of data which can be transmitted without receiving corresponding ACK (and waiting for the ACK in buffer, of course) is limited by awnd size even when cwnd is expanded considerably in this manner, unless the corresponding variation occurs in awnd also. Such limitation may make it impossible to transmit any new packet.

In order to avoid such inconvenience, awnd' sets to a sufficiently small size so that awnd (>awnd') may be advertised temporarily instead of awnd' upon reception of the latter ACKs (35). In this way, general node (2) gains additional buffer space to transmit new packet (37).

On the side of the proposal node (1), after reception of new packet (37), sequence number of the lost packets can be determined and this information can be added to option field of TCP packets, so called SACK block, and proposal node (1) transmits them.

Consequently, it becomes possible on the side of general node (2) to determine the packet which has been lost and thereafter to make SACK retransmission.

As will be apparent from the foregoing description of the present invention, it can be confirmed that three functions, retransmission by FRT and transmission of new packet by FRC as well as SACK retransmission taking place are properly functioning upon the end of connection interruption by improvement of proposal node.

Now the optimal number of transmissions to be made by said pseudo ACKs and the optimal setting of awnd' to further improve transmission efficiency will be described.

First, the number of duplicated ACKs is discussed. Upon recovery of radio condition, TCP layer (respective connections thereof) on the side of proposal node (1) transmits a plurality of pseudo ACKs. Transmission of at least four pseudo ACKs allows for retransmission to transmitter's TCP by FRT.

On the implementation of TCP Reno, FRC-state is established as the number of pseudo ACKs exceeds four and cwnd is expanded by 1 MSS (maximum segment size) every time duplicated pseudo ACKs arrive. It is expected to promote transmission of new data by increasing the number of duplicated pseudo ACKs which are transmitted. This is particularly effective when timeout occurs during communication interruption since cwnd has been reset to the minimum value (1 MSS).

However, an inequlity $$\text{cwnd} > \text{awnd} \tag{1}$$

is established when the number of transmitted duplicated pseudo ACKs exceeds a predetermined number ($D_{max}$), so the maximum amount of data which can be transmitted without receiving corresponding ACK would be restricted by size of awnd and further transmission of duplicated ACKs would be ineffective.

To determine $D_{max}$, it is necessary to take account of variation in cwnd and ssthresh (slow-start threshold). ssthresh is set to 2 MSS when TCP receives three duplicated ACKs and enters FRT/FRC-state, and cwnd takes a value corresponding to the number of received duplicated ACKs plus ssthresh size as expressed by $$\text{cwnd} = (D+2)MSS \tag{2}$$

Based on inequality (1), $$(D+2)MSS > awnd \tag{3}$$

and $$D > \frac{awnd}{MSS} - 2 \tag{4}$$

Of D obtained by the equation (4), the minimum integral value thereof corresponds to the maximum value $D_0$ of effective duplicated ACKs. Namely, $$D_0 = ceil\left(\frac{awnd}{MSS}\right) - 2 \tag{5}$$

However, it should be taken into account that first pseudo ACKs transmitted upon recovery of communication may not be recognized as duplicated one. (This may happen, for example, when the copied ACK was also lost and was not received due to communication interruption.) Advertised receive window size is changed over from awnd' to awnd from fifth pseudo ACK, not from fourth pseudo ACK, because the first pseudo ACK is not counted as duplicated ACK.

The maximum number ($D_{max}$) of effective pseudo ACK transmissions corresponds to the maximum number of effective duplicated ACKs plus 2 as expressed by $$D_{max} = D_0 + 2 \tag{6}$$
$$= ceil\left(\frac{awnd}{MSS}\right)$$

Assumed, for example, that MSS is 1,460 Bytes and awnd size is 65,536 Bytes, $D_{max}=45$ according to the above equation.

Now the optimal value of awnd' is determined. In order to retransmit all packets, SACK retransmission illustrated in FIG. 3 must be initiated.

For SACK retransmission, two parameters, i.e., cwnd and pipe are compared to each other and if $$\text{cwnd} > \text{pipe} \tag{7}$$

is determined when SACK retransmission becomes possible, an amount of data corresponding to a difference between these parameters may be retransmitted by SACK function. In other words, value of awnd' may be determined to meet such requirement. Most preferably, value of awnd' should be determined to allow SACK retransmission to function effectively even under the most severe requirement such that cwnd is minimized by the occurrence of timeouts.

First, the effective minimum cwnd value is determined. During communication interruption, occurrence of two or more TCP timeouts induces slow start whereby cwnd is reset to 1 MSS and ssthresh is set to 2 MSS. Thereafter ssthresh is not changed up to the end of FRC state. When SACK retransmission is enabled, i.e., in second FRT phase (40) as seen in FIG. 3, cwnd is set equal to ssthresh based on the definition of SACK-TCP function as expressed by $$cwnd = ssthresh. \tag{8}$$

Then it takes 2 MSS, its minimum value at the beginning of SACK retransmission.

Similarly, the effective maximum value of pipe is determined. It should be understood that "pipe" is a variable representing an amount of portion in the data which has been transmitted but still not acknowledged by ACK packet or SACK block. It is defined by $$Pipe = HighData - HighAck - AmountSacked \tag{9}$$

where HighData and HighAck respectively represent the largest sequence number which has been transmitted and largest sequence number which has been acknowledged by ACK packet, and AmountSacked represents the number of octets which has been confirmed the reception by SACK block. For ease of consideration, discussion hereafter uses approximated parameter on the basis of the number of segments, i.e. packet number, not sequence number.

The pipe value begin to be calculated when TCP enters FRT state upon reception of SACK option. The side of transmitter has transmitted data using the above described pseudo ACKs until the transmission window is expanded to enough large size. Accordingly, $$HighData - HighAck = \frac{awnd}{MSS} \tag{10}$$

Four ACKs with SACK option have been received to enter FRT, so AmountSacked reaches its maximum value of 4 (segments) and initial pipe value $pipe_{INIT}$ is given by $$pipe_{INIT} = \frac{awnd}{MSS} - 4 \tag{11}$$

Thereafter, pipe is successively subjected to subtraction every time SACK block arrives and upon arrival of n th SACK, a following relationship:

$$pipe_n = \frac{awnd}{MSS} - 4 - 5 - \ldots - n \tag{12}$$
$$= \frac{awnd}{MSS} - \sum_{i=4}^{a} i$$
$$= \frac{awnd}{MSS} - \frac{n(n+1)}{2} + 6$$

is established.

From cwnd and $pipe_n$ obtained in this manner, a following relationship is established:

$$cwnd > pipe_n \tag{13}$$
$$2 > \frac{awnd}{MSS} + \left(6 - \frac{n(n+1)}{2}\right)$$

n SACKs are obtained by previously transmitting n new packets using duplicated ACKs. The number of times these new packets should be transmitted depends on a difference between awnd and awnd'. So it eventually defined by $$n = \frac{awnd - awnd'}{MSS} \tag{14}$$

where awnd and MSS are known depending on given environment and substitution of them leads to inequality depending the value of awnd'. The maximum size of awnd' satisfying this inequality is the optimal value.

The present invention uses the inequalities and equations as have been described to determine the optimal size of awnd' and thereby to excellent method of communication.

The inventors conducted a series of experiments to demonstrate the effect of the present invention. From these experiments, it was confirmed that communication can be rapidly recovered, on one hand, and a degree at which the transmission performance is deteriorated due to use of minimized awnd during normal communication was assayed, on the other hand.

Figure 4:
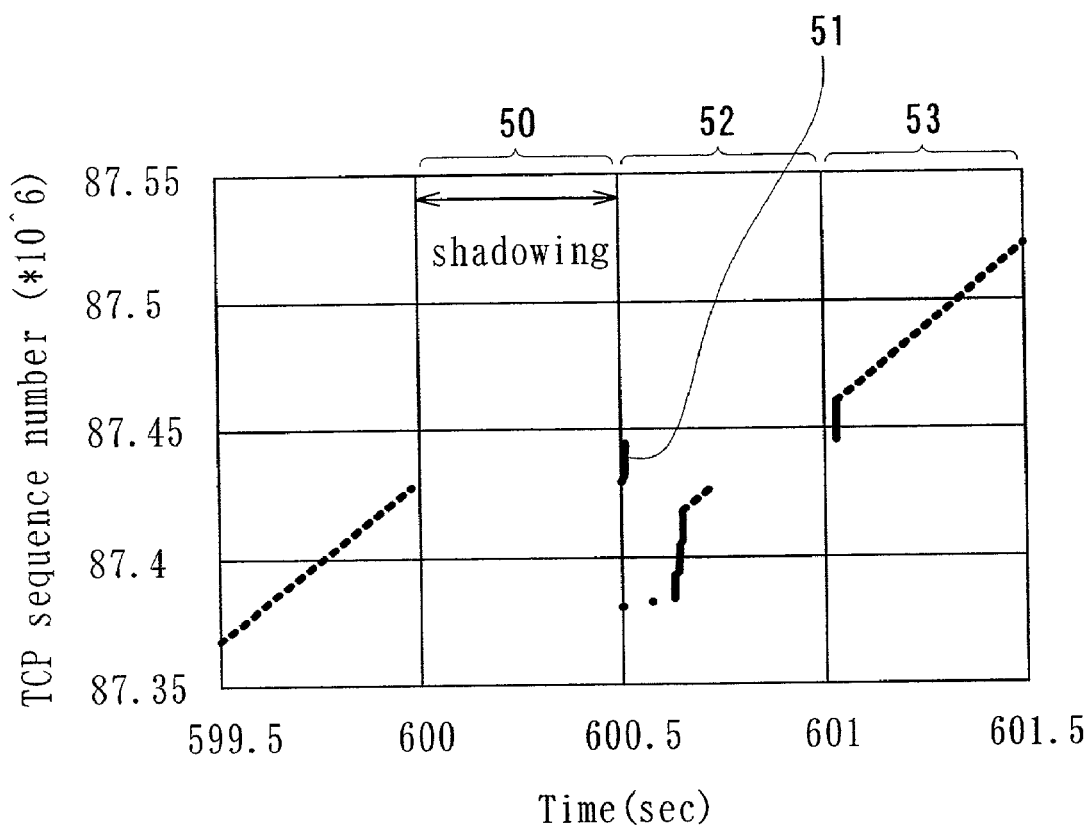
FIG. 4 is a graphic diagram indicating transmission behavior according to the present invention observed in experiment on the assumption of communication interruption for 0.5 sec.

FIG. 4 illustrates transmission behavior affected by communication interruption for 0.5 sec. Based on the above described method of calculation, awnd during normal state was set to 50,000 Bytes, awnd' upon recovery state was set to 65,536 Bytes corresponding to actual buffer size, and duplicated ACKs was set to 45.

As will be apparent from result of experiments, the method according to the invention ensures that packet transmission can be started (51) upon recovery state even communication interruption lasts for relatively long period. Transmission rate can be recovered (53) substantially same as that before communication interruption had occurred after approximately 0.5 second has been taken to complete retransmission (52).

The present invention is not limited to the above described embodiment but applicable also in various networks including radio link area. For example, instead of the arrangement illustrated by FIG. 1 in which network such as LAN is interposed between proposal node and radio communication realizing antenna, it is possible to integrate proposal node and antenna together. Relationship between general node and basic network such as internet is also optionally selected.

Even in the case of continuous packet loss due to communication interruption for relatively long period, the present invention allows communication to be rapidly recovered as if interruption has lasted for extremely short period and thereby solves conventional problem of delayed recovery.

Particularly for communication using millimeter wave band, the packet communication method and the proposal node according to the present invention allow high speed communication on high quality link to be further developed and provide efficient countermeasure against communication interruption possibly occurring in millimeter wave band.

Furthermore, the method according to the present invention allows communication method of high performance and low cost to be realized without modification of network arrangement because the novel method can solve various problems of prior art by improvement of proposal node alone.

What is claimed is:

1. Method of packet communication in network at least partially including radio communication area, said method comprising, after packet loss occurred due to interruption of communication between proposal node to make radio communication using TCP and general node placed on said network and functioning as device being able to make standard TCP communication, the method comprising the steps of:

detecting communication recovery by said proposal node;

informing of detected communication recovery from said proposal node to said general node; and starting data retransmission by said general node upon being informed of communication recovery, wherein said proposal node transmits D times pseudo duplicated acknowledgements, said D being calculated by $$D=ceil(awnd/MSS)$$

where awnd represents advertised receive window size of said proposal node after expanded on recovery state and MSS represents the maximum segment size.

2. The method of packet communication as defined by claim 1, said method comprising, after packet loss occurred due to interruption of TCP using communication between said proposal node and said general node, steps of: transmitting duplicated pseudo acknowledgements from said proposal node to said general node upon recovery of communication; retransmitting lost packets from said general node to said proposal node on the basis of pseudo acknowledgements received by said general node; expanding advertised receive window size of said proposal node and sending this expanded advertised receive window size by and from said proposal node to said general node; and restarting communication including respective steps of transmitting new packets in response to respective expansions of said advertised receive window size.

3. The method of packet communication as defined by claim 1, wherein said advertised receive window side is minimized during normal state and expanded to the size corresponding to actual receiving buffer size upon recovery state.

4. The method of packet communication as defined by claim 2, wherein said advertised receive window side is minimized during normal state and expanded to the size corresponding to actual receiving buffer size upon recovery state.

5. The method of packet communication as defined by claim 1, wherein for advertisement in small value of advertised receive window size during normal state, said proposal node calculates awnd's satisfying both of following inequality and equation:

$$2>awnd/MSS+(6-n(n+1)/2)$$

and $$n=(awnd-awnd')/MSS$$

where awnd represents advertised receive window size of said proposal node after expanded on recovery state, awnd' represents small value of advertised receive window size on normal state and MSS represents the maximum segment size.

6. The method of packet communication as defined by claim 2, wherein for advertisement in small value of advertised receive window size during normal state, said proposal node calculates awnd's satisfying both of following inequality and equation:

$$2>awnd/MSS+(6-n(n+1)/2)$$

and $$n=(awnd-awnd')/MSS$$

where awnd represents advertised receive window size of said proposal node after expanded on recovery state, awnd' represents small value of advertised receive window size on normal state and MSS represents the maximum segment size.

7. The method of packet communication as defined by claim 3, wherein for advertisement in small value of advertised receive window size during normal state, said proposal node calculates awnd's satisfying both of following inequality and equation:

$$2>awnd/MSS+(6-n(n=1)/2)$$

and $$n=(awnd-awnd')/MSS$$

where awnd represents advertised receive window size of said proposal node after expanded on recovery state, awnd' represents small value of advertised receive window size on normal state and MSS represents the maximum segment size.

8. The method of packet communication as defined by claim 4, wherein for advertisement in small value of advertised receive window size during normal state, said proposal node calculates awnd's satisfying both of following inequality and equation:

$$2>awnd/MSS+(6-n(n+1)/2)$$

and $$n=(awnd-awnd')/MSS$$

where awnd represents advertised receive window size of said proposal node after expanded on recovery state, awnd' represents small value of advertised receive window size on normal state and MSS represents the maximum segment size.

9. Proposal node to make radio communication using TCP, comprising:

means to detect the end of communication interruption, to confirm that received signal power has exceeded a predetermined threshold level and thereby to detect communication recovery;

means to transmit pseudo duplicated acknowledgment; and means for adjusting the advertised receive window size of the proposal node to transmit advertisement to said general node, wherein said proposal node transmits D times pseudo duplicated acknowledgements, said D being calculated by $$D=ceil(awnd/MSS)$$

where awnd represents advertised receive window size of said proposal node after expanded on recovery state and MSS represents the maximum segment size.

10. The proposal node as defined by claim 9, wherein said proposal node small value of advertised receive window size of said proposal node for advertisement during normal state and expands advertised receive window size to actual receiving buffer size using said size adjusting means after transmission of acknowledgements by said pseudo duplicated signal transmitter means and transmits the advertised receive window size expanded in this manner to said general node.

11. The proposal node as defined by claim 9, wherein for advertisement in small value of advertised receive window size during normal state, said proposal node calculates awnd's satisfying both of following inequality and equation: $2>awnd/MSS+(6-n(n+1)/2)$ and $n=(awnd-awnd')/MSS$ where awnd represents advertised receive window size of said proposal node after expanded on recovery state, awnd' represents small value of advertised receive window size on normal state and MSS represents the maximum segment size and advertises the maximum value of these awnd's obtained in this manner.

12. The proposal node as defined by claim 10, wherein for advertisement in small value of advertised receive window size during normal state, said proposal node calculates awnd's satisfying both of following inequality and equation: $2>awnd/MSS+(6-n(n+1)/2)$ and $n=(awnd-awnd')/MSS$ where awnd represents advertised receive window size of said proposal node after expanded on recovery state, awnd' represents small value of advertised receive window size on normal state and MSS represents the maximum segment size and advertises the maximum value of these awnd's obtained in this manner.

13. Method of packet communication in network at least partially including radio communication area, said method comprising, after packet loss occurred due to interruption of communication between proposal node to make radio communication using TCP and general node placed on said network and functioning as device being able to make standard TCP communication, the method comprising the steps of:
    detecting communication recovery by said proposal node;
    informing of detected communication recovery from said proposal node to said general node; and
    starting data retransmission by said general node upon being informed of communication recovery,
    wherein for advertisement in small value of advertised receive window size during normal state, said proposal node calculates awnd's satisfying both of following inequality and equation:

$$2>awnd/MSS+(6-n(n+1)/2)$$

and $$n=(awnd-awnd')/MSS$$

where awnd represents advertised receive window size of said proposal node after expanded on recovery state, awnd' represents small value of advertised receive window size on normal state and MSS represents the maximum segment size.

14. The method of packet communication as defined by claim 13, wherein said advertised receive window side is minimized during normal state and expanded to the size corresponding to actual receiving buffer size upon recovery state.

15. Proposal node to make radio communication using TCP, comprising:
    means to detect the end of communication interruption, to confirm that received signal power has exceeded a predetermined threshold level and thereby to detect communication recovery;
    means to transmit pseudo duplicated acknowledgment; and
    means for adjusting the advertised receive window size of the proposal node to transmit advertisement to said general node
    wherein for advertisement in small value of advertised receive window size during normal state, said proposal node calculates awnd's satisfying both of following inequality and equation: $2>awnd/MSS+(6-n(n+1)/2)$ and $n=(awnd-awnd')/MSS$ where awnd represents advertised receive window size of said proposal node after expanded on recovery state, awnd' represents small value of advertised receive window size on normal state and MSS represents the maximum segment size and advertises the maximum value of these awnd's obtained in this manner.

* * * * *